United States Patent
Wang et al.

(10) Patent No.: US 12,483,905 B2
(45) Date of Patent: Nov. 25, 2025

(54) WIRELESS COMMUNICATIONS DEVICE, WIRELESS COMMUNICATIONS SYSTEM, RADIO BEAM ALLOCATION METHOD, AND RECORDING MEDIUM

(71) Applicant: Fujitsu Limited, Kawasaki (JP)

(72) Inventors: Xiangyu Wang, Kawasaki (JP); Koji Ogawa, Yokohama (JP); Yasunori Otsuka, Edogawa (JP)

(73) Assignee: Fujitsu Limited, Kawasaki (JP)

( * ) Notice: Subject to any disclaimer, the term of this patent is extended or adjusted under 35 U.S.C. 154(b) by 414 days.

(21) Appl. No.: 18/093,865

(22) Filed: Jan. 6, 2023

(65) Prior Publication Data
US 2023/0308895 A1    Sep. 28, 2023

(30) Foreign Application Priority Data
Mar. 25, 2022   (JP) ................... 2022-050280

(51) Int. Cl.
*H04W 16/28*   (2009.01)
*H04W 76/28*   (2018.01)

(52) U.S. Cl.
CPC .......... *H04W 16/28* (2013.01); *H04W 76/28* (2018.02)

(58) Field of Classification Search
CPC .............................. H04W 16/28; H04W 76/28
See application file for complete search history.

(56) References Cited

U.S. PATENT DOCUMENTS

| | | |
|---|---|---|
| 2006/0274776 A1 | 12/2006 | Malik et al. |
| 2018/0084440 A1* | 3/2018 | Nagaraja ............... H04W 16/28 |
| 2020/0077320 A1* | 3/2020 | Shimoda .......... H04W 36/0016 |
| 2020/0275287 A1 | 8/2020 | Kumagai |

(Continued)

FOREIGN PATENT DOCUMENTS

| | | |
|---|---|---|
| EP | 1 662 677 A1 | 5/2006 |
| JP | 2005-94337 A | 4/2005 |
| JP | 2020-53897 A | 4/2020 |

(Continued)

OTHER PUBLICATIONS

The extended European Search Report and the European Search Opinion issued by the European Patent Office for corresponding European Patent Application No. 23151825.9-1206, mailed on Aug. 10, 2023.

(Continued)

*Primary Examiner* — Derrick V Rose
(74) *Attorney, Agent, or Firm* — Myers Wolin, LLC (57) ABSTRACT

A wireless communications device configured to perform wireless resource management at a base station that performs wireless communication with a plurality of terminals by a predetermined beam, includes a memory storing therein a plurality of beam tables set with the terminals accommodated by a plurality of beams, and a processor connected to the memory and configured to manage the beam tables. The processor, during system operation, determines a movable terminal that, of the terminals, is movable between the beam tables and determines another beam table that, of the beam tables, is capable of accommodating the movable terminal. The processor moves the moveable terminal to the other beam table and adjusts a number of the terminals accommodated by each of the beam tables.

20 Claims, 6 Drawing Sheets

(56) References Cited

U.S. PATENT DOCUMENTS

2020/0367175 A1    11/2020  Fukui et al.

FOREIGN PATENT DOCUMENTS

| JP | 2020156074 A | * | 9/2020 | ............ | H04W 24/02 |
|----|--------------|---|--------|--------------|------------|
| WO | 2018/124259 A1 | | 7/2018 | | |
| WO | 2019/155578 A1 | | 8/2019 | | |
| WO | 2020/227859 A1 | | 11/2020 | | |

OTHER PUBLICATIONS

Notice of Reasons for Refusal issued by the Japan Patent Office for corresponding Japanese Patent Application No. 2022-050280, dated May 20, 2025, with an English translation.

* cited by examiner

WIRELESS COMMUNICATIONS DEVICE, WIRELESS COMMUNICATIONS SYSTEM, RADIO BEAM ALLOCATION METHOD, AND RECORDING MEDIUM

CROSS REFERENCE TO RELATED APPLICATIONS

This application is based upon and claims the benefit of priority of the prior Japanese Patent Application No. 2022-050280, filed on Mar. 25, 2022, the entire contents of which are incorporated herein by reference.

FIELD

The embodiments discussed herein relate to a wireless communications device, a wireless communications system, a radio beam allocation method, and a recording medium.

BACKGROUND

In a 5th Generation (5G) mobile communications system, Nodes that configure a radio access network (RAN) are classified into central units (CUs), distributed units (DUs), and remote units (RUs).

A DU and RU are connected via a front haul interface and the DU controls the RU, which has a transceiver. At the RU, beam control with directivity is possible by controlling the phase and amplitude of an antenna. Here, there is a limit on mobile terminals (user equipment (UE)) accommodated by beams of the RU. When the DU is determining a beam to accommodate a UE and assignment of the UE to an optimal beam is not possible due to this limit, high-quality service to the user is hindered.

As for existing techniques of beam allocation, for example, there is a technique in which a base station measures signal reception quality for each signal transmitted from terminals, groups beams according to antenna, and for each beam, controls the electrical power of the transmitted signals of the terminals. Further, for example, there is a technique in which a base station predicts a beam group for transmitting data to a terminal, according to movement trends of the terminal. Further, for example, there is technique in which a base station transmits a beam forming candidate beam to a terminal, receives reception power information and identification information of a beam for which the reception power measured for each of multiple measurement blocks by the terminal satisfies a predetermined condition, and selects a suitable beam. For examples, refer to International Publication No. WO 2019/155578, Japanese Laid-Open Patent Publication No. 2020-156074, and Japanese Laid-Open Patent Publication No. 2020-053897.

SUMMARY

According to an aspect of an embodiment, a wireless communications device configured to perform wireless resource management at a base station that performs wireless communication with a plurality of terminals by a predetermined beam, includes: a memory storing therein a plurality of beam tables set with the terminals accommodated by a plurality of beams; and a processor connected to the memory and configured to manage the beam tables. The processor, during system operation, determines a movable terminal that, of the terminals, is movable between the beam tables and determines another beam table that, of the beam tables, is capable of accommodating the movable terminal. The processor moves the moveable terminal to the other beam table and adjusts a number of the terminals accommodated by each of the beam tables.

An object and advantages of the disclosure will be realized and attained by means of the elements and combinations particularly pointed out in the claims.

It is to be understood that both the foregoing general description and the following detailed description are exemplary and explanatory and are not restrictive of the disclosure.

DETAILED DESCRIPTION

First, problems associated with the conventional techniques are discussed. In the conventional techniques, in an instance in which a service is unavailable due to congestion of resources used in the service, an affected UE is refused use of the service. For example, when an upper limit of the number of UEs accommodated by a beam ID table in the DU is reached, new assignment of a UE to the beam ID table for which the upper limit has been reached and reassignment of a UE to another beam ID table becomes impossible.

Improving user satisfaction is essential for all mobile communications providers and it is important to always accept the utilization of services needed by UE users. Meanwhile, instances may occur in which wireless quality of a UE actually using a service degrades and it is desirable to reassign the UE to another beam ID. In the conventional techniques, beam table management optimizing UE accommodation to beam ID tables according to fluctuations in wireless quality, congestion, etc. is not performed.

Embodiments of a disclosed wireless communications device, wireless communications system, radio beam allocation method, and radio beam allocation program are described in detail with reference to the accompanying drawings.

Figure 1:
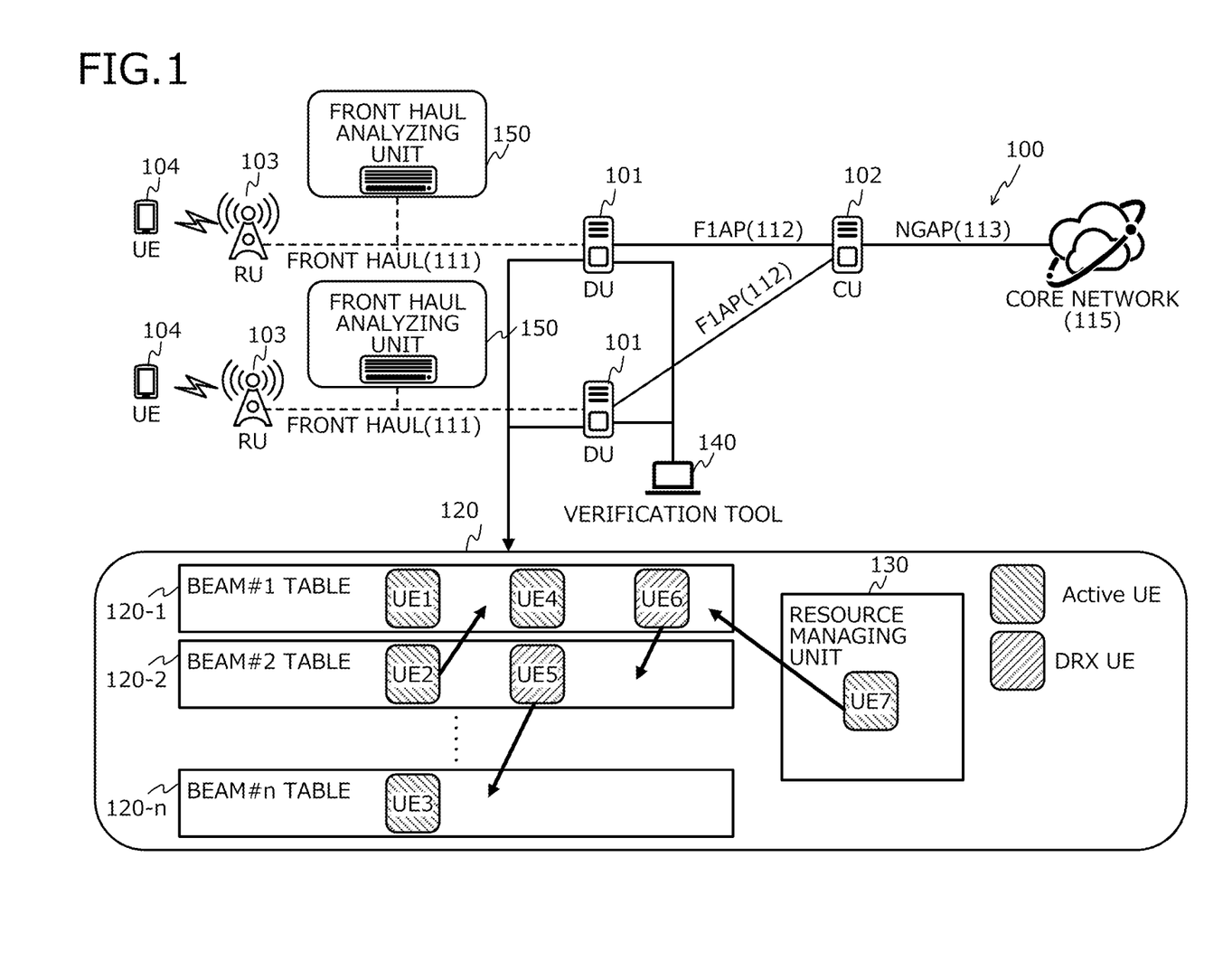
FIG. 1 is a diagram depicting an example of a configuration of a wireless communications system according to an embodiment.

FIG. 1 is a diagram depicting an example of a configuration of a wireless communications system according to an embodiment. A wireless communications system 100 includes and is configured by a DU 101, which is a wireless communications device of the embodiment, a CU (control station) 102, a RU (base station) 103, and a UE (terminal) 104.

The DU 101 and the RU 103 are connected by an interface (IF) of a front haul 111. The DU 101 and the RU 103 transmit and receive control signals and data signals via the front haul 111. The RU 103 performs radio frequency (RF) transmission and reception with respect to the UE 104 via an antenna.

Multiple DUs 101 are connected to the CU 102 by an IF of the F1 Application Protocol (F1AP) 112. The DU 101 and the CU 102 transmit and receive control signals and data signals via the F1AP 112. The CU 102 is connected to an external core network 115 via an IF of an NG Application Protocol (NGAP) 113.

The DU 101 manages beam a table 120 for each subordinate RU 103. The beam table 120 is for managing the UEs 104 assigned to each beam of a RU 103. The beam table 120 has n records 120-1 to 120-n respectively for beams #1 to #n. The records 120-1 to 120-n of a quantity n correspond to the beam tables 120 of a quantity of n. The n beam tables 120, for example, are for different beam emission directions. The RU 103 transmits a beam to the UE 104 based on control and setting of the beam table 120 managed by the DU 101.

The number of beams controlled by a single antenna of the RU 103 has an upper limit; under 5G, the Sub-6 band has a maximum of 8 beams (n is a maximum of 8) and the mmW band has a maximum of 64 beams (n is a maximum of 64), that can be used.

A limit in the number of the UEs 104 that each of then beam tables 120 (120-1 to 120-n) accommodates occurs due to a resource limit. In FIG. 1, for the sake of simplicity, an example is depicted in which the number of the UEs 104 that may be accommodated per one beam table 120 (for example, 120-1) is three. In this instance, for example, the beam table 120-1 already accommodates three of the UEs 104 (UE1, UE4, UE6) and even when there is a new UE 104 or a UE 104 that is to be moved to beam #1, the maximum limit has been reached and thus, the beam table 120-1 cannot accommodate the UE 104.

In the present embodiment, the resources of the beam table 120 are finite and in this configuration, a constraint arises in the number of beams; the DU 101 performs beam reallocation with respect to the multiple beam tables 120 and optimizes the beam tables 120.

The DU 101 implements each of the following processes (1) to (3) as an optimization process of the beam tables 120, which are resources. The DU 101 performs process (1) each prescribed period during operation of the system, and performs processes (2), (3) individually at respective timings (opportunities) during the operation of process (1).

Process (1) is a process for periodic resource reallocation. The DU 101 periodically checks reception quality by a report, for example, signal to interference ratio (SIR) of a downlink reference signal, etc. from the UE 104. Subsequently, the DU 101, when detecting that the reception quality is lower than a threshold (first threshold) at which reception is performed stably, that is, when detecting degradation of the reception quality, executes reallocation control with respect to the UEs 104 present in the concerned beam table 120.

The DU 101, for example, for each beam of the UEs 104, sets, as the threshold, a reception quality (level) regarded to enable stable continuous use of the beam. Further, the DU 101, for example, moves a UE 104 that is subject to beam reallocation to another beam table 120 of a beam capable of ensuring stable reception quality.

More specifically, the DU 101 determines the number of UEs for beam reallocation (for reassignment), by usage rates of the beam tables 120 and then, selects a UE for beam reallocation and executes reallocation, until usage rates are constant. The DU 101, when selecting a UE for beam reallocation, checks for the UEs 104 in a discontinuous reception (DRX) state, available capacity of a reallocation candidate beam table 120, or usage history of a reallocation candidate beam table 120.

States of the UEs 104 include, for example, Active, Inactive, and DRX. Active indicates a state in which the UE 104 is allocated uplink and downlink resources and is capable of communication. Inactive indicates a dormant state of a NAS layer, a RRC layer including RRC_INACTIVE, etc. DRX indicates a state for conserving device power by intermittent signal reception and suspending some functions during the periods when reception is not performed.

The DU 101, when selecting a UE for beam reallocation, preferentially selects a UE 104 in the DRX state, a UE 104 to be moved to a beam table 120 with a greater available capacity among the reallocation candidates or a beam table 120 that has no assigned UEs among the reallocation candidates.

For example, the DU 101 checks the UE state in the beam tables 120 and UEs 104 in the "Active state" and the DRX state are assumed to be present. The DRX state is a sleep state induced by intermittent reception that suppresses data communication as compared to the "Active state" and therefore, the DU 101 preferentially determines a UE 104 in the DRX state as a UE 104 for beam reallocation.

After a UE is selected for beam reallocation and when, based on the measurement results reported by the UE 104, a beam is present that is capable of ensuring stabler reception quality than that of the beam currently used, the DU 101 decides to move the UE to said beam. Subsequently, the DU 101 checks the available capacity of the beam table 120 determined as a candidate and executes allocation when the beam table 120 can further accommodate a UE. When the beam table 120 does not have enough available capacity, another UE 104 is selected as a subsequent candidate and, again, the allocation process is executed. Further, the DU 101 repeats the reallocation process until the usage rates of the n beam tables 120 become constant, whereby reception quality is maintained, and congestion becomes uniform.

For example, FIG. 1 depicts an instance in which a resource managing unit 130 of the DU 101 that manages resources of the beam tables 120 sets a UE 104 that is in the DRX state, as a UE for beam reallocation. In this instance, in the beam table 120-1 of beam #1 for which the UE accommodation limit has been reached, the resource managing unit 130 is assumed to detect UE6, which is in the DRX state. In this instance, the resource managing unit 130 moves UE6 to the beam table 120 of a beam that is capable of ensuring stable reception quality, for example, among other beams #2 to #n, beam #2 (the beam table 120-2). Further, in the beam table 120-2 of beam #2, the resource managing unit 130 is assumed to detect UE5, which is in the DRX state. In this instance, the resource managing unit 130 moves UE5 to, for example, beam #n (the beam table 120-n). As a result, the DU 101 performs adjustment to make the usage rates (number of UEs) of the n beam tables 120 uniform.

Further, in an instance in which there are multiple UEs 104 for beam reallocation, the DU 101 may preferentially reassign a UE 104 that can be moved to another beam table 120 that has a greater available capacity among the beam tables 120 that can be reallocated. Further, in an instance in which there are multiple UEs 104 for beam reallocation, the DU 101 may preferentially reassign, based on the usage history of the beams of the UEs 104 that are to be subject to beam reallocation, a UE 104, which can be moved to a beam table 120 that has no history of reassignment of the UE 104.

Further, in an instance in which there are multiple UEs 104 for beam reallocation, the DU 101 may check the reception quality of the UEs 104 for beam reallocation and may preferentially reassign the UE 104 that has the lowest reception quality.

The periodic resource reallocation process, as depicted in FIG. 1, may be performed by connecting a verification tool 140 to the DU 101. When verification in field trials and/or system tests are performed by the mobile communications provider or vender, the tester may use the verification tool 140 to input the intended downlink reception quality to the DU 101 from the verification tool. In this manner, in the periodic resource reallocation process, instead of notification of the reception quality from the UE 104, the tester inputs information of the intended reception quality to the DU 101 from the verification tool 140. As a result, it becomes possible to implement an efficient test without actually measuring reception quality of the UE 104 in wireless segments.

Further, the periodic resource reallocation process may be performed using a front haul analyzing unit 150 that is a general-purpose tool for analyzing the front haul 111 between the RU 103 and the DU 101. The front haul analyzing unit 150 inputs to the DU 101, information obtained by overwriting the reception quality intended by the tester with the notified reception quality. As a result, it becomes possible to implement an efficient test without using actual reception quality of the UE in wireless intervals.

Process (2) is a process for immediate resource allocation for a UE 104 newly requesting connection. A periodic interval during which the periodic resource reallocation is implemented by process (1) described above may be arbitrarily set by operating conditions, from a short interval to a long interval. Therefore, in an instance in which the periodic interval is a long interval, a new connection request for a UE 104 may occur before a beam table 120 becomes uniform and when this occurs, the beam table 120 may be unable to accommodate the UE 104.

In this regard, the DU 101 takes the connection request from the UE 104 as an opportunity to check the reception quality of UEs 104 in the corresponding beam table 120, sets a UE 104 whose reception quality is less than the threshold as a reassignment candidate, and performs reallocation.

On the other hand, even when the periodic interval is a short interval, the beam table 120 may not have any available resources. This occurs in a case in which no UE 104 is present that is at most equal to the threshold used for checking the downlink reference signal. In this instance, when connection is refused for a UE 104 newly requesting connection, there is concern that service satisfaction will decline.

Therefore, in the present embodiment, the DU 101 sets the threshold to have different steps. The DU 101, in process (2) for immediate resource allocation for a UE 104 newly requesting connection, uses a threshold (second threshold) at which stable reception is performed (first threshold<second threshold) and that is of a higher level than the threshold (the first threshold) used in the periodic resource reallocation process (1). For example, the SIR of the second threshold is higher than the SIR of the first threshold. Further, the DU 101 sets multiple second thresholds that are used to check reception quality, the second thresholds being progressively set stepwise from a lowest level to a high level and; as a UE for beam reallocation, the DU 101 sets the UE 104 whose reception quality is best.

Further, when selecting a UE for beam reallocation, the DU 101 checks for a UE 104 in the DRX state, the available capacity of the reallocation candidate beam tables 120, or usage history of the reallocation candidate beam tables 120. Further, the DU 101 may preferentially set a UE 104 that is in the DRX state, a UE 104 to be moved to a beam table 120 with a greater available capacity among the reallocation candidates or a beam table 120 that has no assigned UEs, among the reallocation candidates.

For example, in the example depicted in FIG. 1, the resource managing unit 130 of the DU 101 managing the resources of the beam tables 120 assumes the beam of a new UE7 to be beam #1 (the beam table 120-1), which has reached the UE accommodation limit. In this instance, in the beam table 120-1, by reallocation, the resource managing unit 130 moves UE6 that is in the DRX state to the beam table 120 of a beam that is capable of ensuring stable reception quality, for example, among the other beams #2 to #n, beam #2 (the beam table 120-2). Further, in the beam table 120-2, the resource managing unit 130 moves UE5 that is in the DRX state to the beam table 120 of a beam capable of ensuring stable reception quality, for example, among the other beams #1, #3 to #n, beam #n (the beam table 120-n). Subsequently, the resource managing unit 130 assigns the new UE7 to beam #1 (the beam table 120-1). As a result, the DU 101 may perform immediate resource allocation for UE7 (104) that newly requests connection.

The process (2) for immediate resource allocation for a UE 104 newly requesting connection, as depicted in FIG. 1, may be performed by connecting the verification tool 140 to the DU 101. In this instance, to verify that a beam table 120 to which the UE 104 is to be assigned does not have enough available capacity, the verification tool 140 performs control to deliberately set the beam table 120 to a "Full state" (maximum limit state).

Process (3) is a process for immediate resource reallocation for a UE 104 requesting beam switching. The periodic interval during which periodic resource reallocation is implemented by process (1) described above may be arbitrarily set from a short interval to a long interval according to operating conditions. Therefore, in an instance in which the periodic interval is a long interval, before the beam table 120 becomes uniform, switching to another beam may occur for an existing UE 104 due to degradation of the quality of the beam currently used by the existing UE 104.

In this regard, the DU 101 takes the connection request from the UE 104 as an opportunity to check the reception quality of a UE 104 in the corresponding beam table 120, sets a UE 104 whose reception quality is lower than the threshold as a reassignment candidate, and performs control.

On the other hand, even in an instance in which the periodic interval is a short interval, the beam table 120 may not have any available resources and this occurs in a case in which no UE 104 is present that is at most equal to the threshold used for checking the downlink reference signal. In this instance, beam switching for the UE 104 is not performed even when switching of an existing UE 104 to another beam due to degradation of the quality of the beam current used occurs, whereby continuation of the service for the concerned UE becomes difficult and if service interruption occurs, there is concern that service satisfaction will decline.

In this regard, in the present embodiment, the DU 101 sets the threshold to have different steps. The DU 101, in the process (3) for immediate resource reallocation for a UE 104 requesting beam switching, uses a threshold (the second threshold) of a higher level than that of the threshold (the first threshold) used to check the downlink reference signal in the periodic resource reallocation process (1). Further, the DU 101 sets the second threshold, which is used to check reception quality, stepwise, progressively from a lowest level to a high level and, as a UE for beam reallocation, sets the UE 104 whose reception quality is best.

Further, when selecting a UE for beam reallocation, the DU 101 checks for a UE 104 in the DRX state, the available capacity of the reallocation candidate beam table 120, or the usage history of the reallocation candidate beam table 120. Further, the DU 101 may preferentially set a UE 104 that is in the DRX state, a UE 104 to be moved to a beam table 120 with a greater available capacity among the reallocation candidates or a beam table 120 that has no assigned UEs, among the reallocation candidates.

For example, in the example depicted in FIG. 1, UE2 of the beam table 120-2 of beam #2 is assumed to require beam switching to the beam table 120-1 of beam #1, which has reached the UE accommodation limit. In this instance, the resource managing unit 130 of the DU 101, for example, in the beam table 120-1 of beam #1, moves UE6 that is in the DRX state to beam #2 (the beam table 120-2), which is capable of ensuring stable reception quality, among the other beam #2 to #n. As a result, it is possible for the resource managing unit 130 to move UE2 for which beam switching is necessary to beam #1 (the beam table 120-1).

The process (3) for immediate resource reallocation for a UE 104 requiring beam switching may be performed by connecting the verification tool 140 to the DU 101 as depicted in FIG. 1. In this instance, to verify that a beam table 120 to which the UE 104 is to be assigned has does not have enough available capacity, the verification tool 140 performs control to deliberately set the beam table 120 to the "Full state".

In this manner, the DU 101 of the embodiment periodically compares the reception quality of the downlink reference signal of the UEs 104 in the beam table 120 with the threshold and when the reception quality is not more than the threshold, the DU 101 selects a beam with a stable high reception quality, based on the measurement results of the UEs 104. Further, the DU 101 the executes the reallocation process for the UE 104 to the selected beam table 120. As a result, the beam tables 120 of the DU 101 may be optimized. At the same time, at the RU 103, optimization in regard to UEs 104 that unnecessarily occupy the finite beams is possible, whereby network operation facilitating connection of a new UE 104, etc. is realized and user satisfaction may be improved.

Further, the verification tool 140 connected to the DU 101 directly sets in the DU 101, the state of a UE 104 and information of the beam table 120 in which the UE 104 is included and may further implement a test intended by the tester. For example, the state of a UE 104 set in the beam table 120 may be changed to Active or DRX by the operation of the verification tool 140. As a result, the number of UEs 104 accommodated in the beam table 120 may be controlled by using the verification tool 140 to control the priority of reallocation subjects, and change, add, or delete information of the UEs 104 set in the beam table 120.

Figure 2:
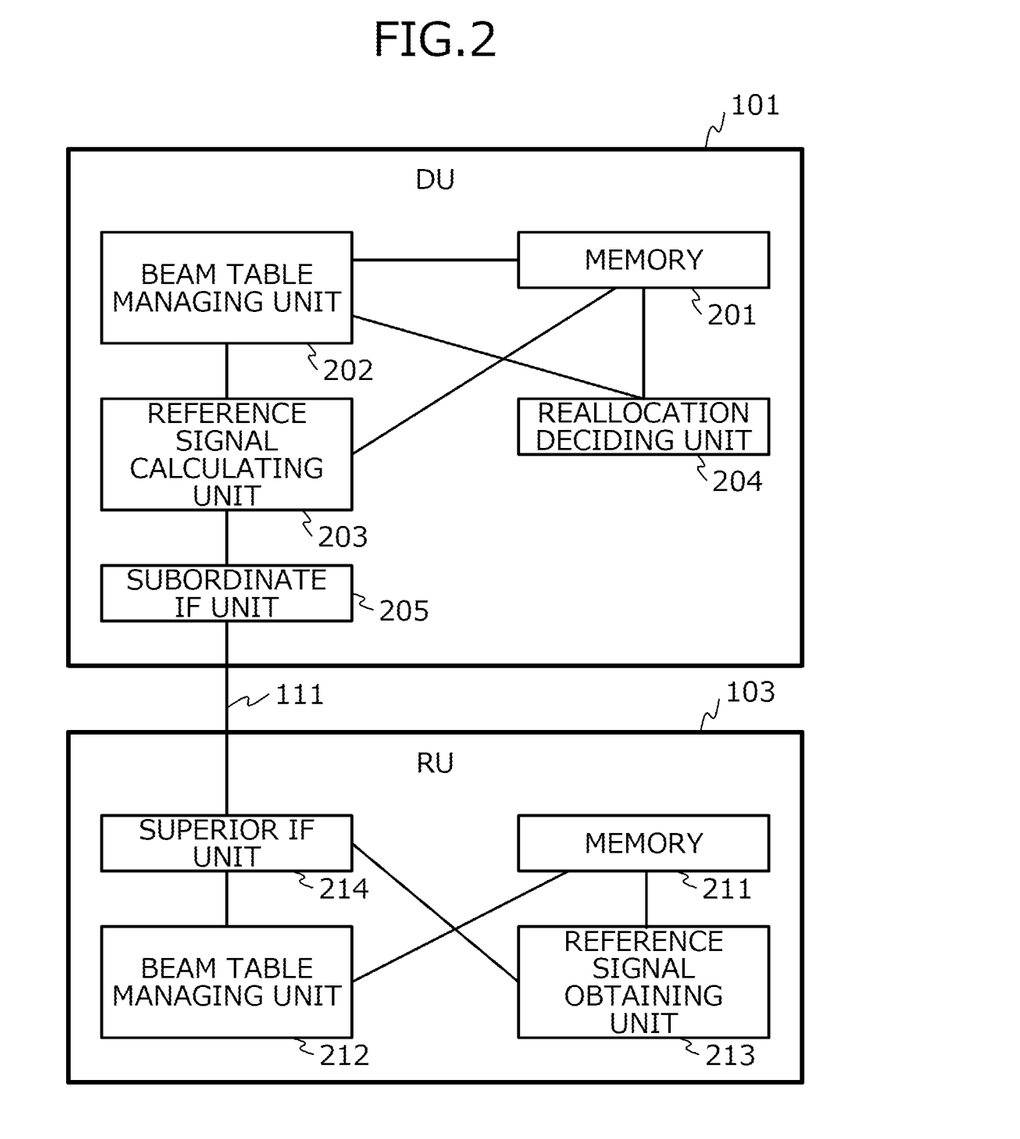
FIG. 2 is a block diagram depicting an example of a functional configuration of a DU and a RU.

FIG. 2 is a block diagram depicting an example of a functional configuration of the DU and the RU. The DU 101 is a superior node of the RU 103. Further, the RU 103 is a subordinate node of the DU 101.

The DU 101 includes a memory 201, a beam table managing unit 202, a reference signal calculating unit 203, a reallocation determining unit 204, and a subordinate IF unit 205.

The beam table managing unit 202 is connected to the memory 201, the reference signal calculating unit 203, and the reallocation determining unit 204. The beam table managing unit 202 manages, by the memory 201, UE information of the UEs 104 in the beam tables 120 assigned to each of the beams.

The reference signal calculating unit 203 is connected to the memory 201, the beam table managing unit 202, and the subordinate IF unit 205. The reference signal calculating unit 203 calculates and outputs to the memory 201, reception quality, for example, the SIR of reference signals obtained from the RU 103.

The memory 201 is connected to the beam table managing unit 202, the reference signal calculating unit 203, and the reallocation determining unit 204. The memory 201 holds downlink reference signal information notified by the RU 103 and information of the beam tables 120 managed by the DU 101.

The reallocation determining unit 204 is connected to the memory 201 and the beam table managing unit 202. The reallocation determining unit 204, at each prescribed period set in advance, makes a reallocation determination of whether to switch to another beam, a UE104 whose downlink reference signal has degraded beyond a predetermined threshold and for which utilization (usage rate) of the corresponding beam table 120 in the memory 201 is congested. The subordinate IF unit 205 terminates an interface of the front haul 111 connected to the RU 103 and outputs downlink reference signals to the reference signal calculating unit 203.

In FIG. 2, while not depicted, the DU 101 includes the resource managing unit 130 in FIG. 1. The resource managing unit 130 controls various types of resources of the DU 101. In the present embodiment, the resource managing unit 130 optimizes the beam tables 120, including the management of the beam tables 120 by the beam table managing unit 202 and the reallocation process by the reallocation determining unit 204.

The RU 103 includes a memory 211, a beam table managing unit 212, a reference signal obtaining unit 213, and a superior IF unit 214.

The reference signal obtaining unit 213 is connected to the memory 211 and the superior IF unit 214. The reference signal obtaining unit 213 reads out a reference signal in the RU 103 and outputs the reference signal to the superior IF unit 214. The beam table managing unit 212 is connected to the memory 211 and the superior IF unit 214. The beam table managing unit 212 manages the UE information of the UEs 104 of the beam tables 120 allocated according to beam, in the memory 211. The superior IF unit 214 terminates the interface of the front haul 111 connected to the DU 101 and outputs the reference signal to the DU 101. The memory 211 holds reference signal information obtained by the RU 103 and the beam tables 120 allocated by the DU 101.

Figure 3:
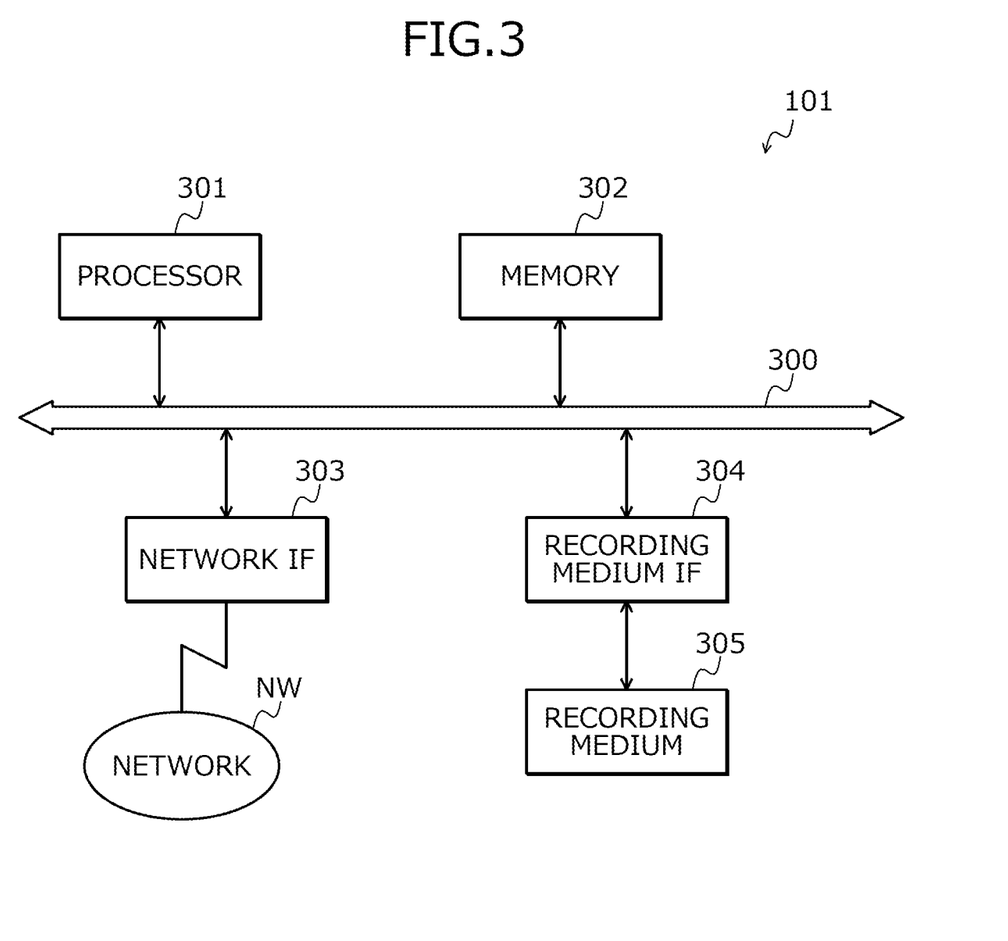
FIG. 3 is a diagram depicting an example of a hardware configuration the DU.

FIG. 3 is a diagram depicting an example of a hardware configuration the DU. The DU 101, which is a wireless communications device, has a processor 301 such as a central processing unit (CPU), a memory 302, a network IF 303, a recording medium IF 304, and a recording medium 305. Further, these components are connected to one another by a bus 300.

Here, the processor 301 is a controller configured to govern overall control of the DU 101. The processor 301 may have multiple cores. The memory 302 includes, for example, read-only memory (ROM), random access memory (RAM), and flash ROM, etc. In particular, for example, the flash ROM stores control programs, the ROM stores application programs, and the RAM is used as work area of the processor 301. Programs stored by the memory 302 are load onto the processor 301, whereby encoded processes are executed by the processor 301.

The network IF 303 is connected to a network NW through a communications line and is connected to other communications devices via the network NW. Other communications devices are, for example, the CU 102 and the RUs 103 depicted in FIG. 1 and the network NW corresponds to a network of, for example, F1AP (112) and the front haul (111). Further, the network IF 303 is configured to administer an internal interface with the network NW and control the input and output of data with respect to other communications devices.

The recording medium IF 304, under the control of the processor 301, controls the reading and writing of data with respect to the recording medium 305. The recording medium 305 stores data written thereto under the control of the recording medium IF 304.

In addition to the components described above, the DU 101 may be connected to, for example, an input device, display, etc., via an IF.

The processor 301 depicted in FIG. 3 implements functions of the beam table managing unit 202, the reference signal calculating unit 203, and the reallocation determining unit 204 of the DU 101 depicted in FIG. 2 by executing a program. Further, the network IF 303 depicted in FIG. 3 corresponds to the subordinate IF unit 205 of the DU 101 depicted in FIG. 2. Further, the beam tables 120 depicted in FIG. 1 may be implemented using the memory 201 depicted in FIG. 2 and the memory 302 and/or the recording medium 305 depicted in FIG. 3.

The RU 103 and the CU 102 may also be configured by hardware similar to that depicted in FIG. 3. Functions of the beam table managing unit 212 and the reference signal obtaining unit 213 of the RU 103 depicted in FIG. 2 may be implemented by an execution of a program by the processor 301 depicted in FIG. 3. Further, the network IF 303 depicted in FIG. 3 corresponds to the superior IF unit 214 of the RU 103 depicted in FIG. 2. Further, the memory 211 depicted in FIG. 2 may be implemented using the memory 302 and/or the recording medium 305 depicted in FIG. 3.

Next, an example of the optimization process for the beam tables 120, which are resources implemented by the DU 101, is described.

Figure 4:
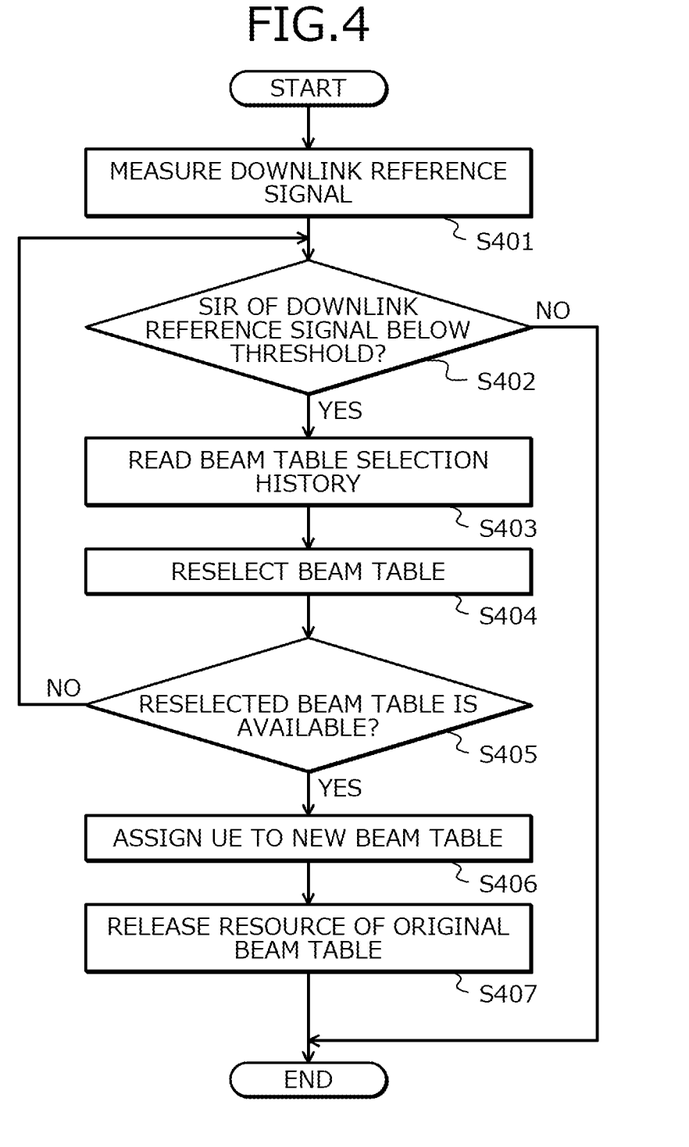
FIG. 4 is a flowchart of an example of a periodic resource reallocation process.

The periodic resource reallocation process (1) is described. FIG. 4 is a flowchart of an example of the periodic resource reallocation process. The controller (the processor 301) of the DU 101 implements the process depicted in FIG. 4 each prescribed period, during operation of the wireless communications system 100. First, the DU 101 measures a report, for example, a downlink reference signal, from a UE 104 (step S401). For example, the DU 101 measures reception quality by the SIR.

Next, the DU 101 determines whether the SIR of the downlink reference signal is below the threshold (step S402). When the determination result indicates that the SIR is below the threshold for performing reception with the SIR of the downlink reference signal being stable (step S402: YES), the DU 101 transitions to the process at step S403. On the other hand, when the SIR of the downlink reference signal is not below threshold (step S402: NO), the DU 101 terminates the process above.

At step S403, the DU 101 reads out the selection history of the beam table 120 (S403). Next, the DU 101 reselects a beam table 120 (step S404).

At step S403 and step S404, the DU 101 may preferentially set a UE 104 that is in the DRX state, a UE 104 to be moved to a beam table 120 with a greater available capacity among the reallocation candidates or a beam table 120 that has no assigned UEs, among the reallocation candidates. For example, in the processing example depicted in FIG. 4, when multiple UEs 104 are to be subject to beam reallocation, a UE 104 that can be moved to a beam table 120 that has no assigned UEs is preferentially selected for beam reallocation, based on the usage history of the UEs 104 that are to be subject to beam reallocation.

Next, the DU 101 determines whether the selected beam table 120 has available capacity to accommodate the UE 104 (step S405). When the determination result at step S405 indicates that the selected beam table 120 has enough capacity (step S405: YES), the DU 101 transitions to the process at step S406. On the other hand, when the selected beam table 120 does not have enough capacity (step S405: NO), the DU 101 returns to the process at step S402.

At step S406, the DU 101 assigns the UE 104 to the new beam table 120 (step S406). Next, the DU 101 releases the resource of the original beam table 120 of the UE 104 (step S407) and ends the process.

In the periodic resource reallocation process depicted in FIG. 4, in an instance in which the reception quality of the downlink reference signal is lower than the set threshold, the DU 101 performs reallocation control for a UE 104 present in the concerned beam table 120, based on the degradation of the reception quality. When a beam table 120 is reallocated, the DU 101, for example, checks for a UE 104 in the DRX state, the available capacity of the reallocation candidate beam table 120, or the usage history of the reallocation candidate beam table 120. Further, the DU 101 preferentially sets, as a subject for beam reallocation, a UE 104 that is in the DRX state, a UE 104 to be moved to a beam table 120 with a greater available capacity among the reallocation candidates or a beam table 120 that has no assigned UEs, among the reallocation candidates.

Further, after a UE is selected for beam reallocation, if a beam is present that is capable of ensuring reception quality that is stabler than that of the beam currently being used, the DU 101 decides to move the UE 104 to the beam, based on measurement results reported by the UE 104. Further, the DU 101 checks the available capacity of another beam table 120 other than the one determined as a candidate and when there is enough capacity, the DU 101 executes reallocation. When there is not enough capacity, the DU 101 selects another UE 104 as the next candidate and, again, executes the reallocation process. Further, the DU 101 repeatedly performs the reallocation process until the usage rates of then beam tables 120 become uniform. As a result, at each prescribed period, the DU 101 may equalize the usage rates (number of UEs) of the respective n beam tables 120.

Further, the downlink reference signal measurement by the DU 101 depicted at step S401 in FIG. 4 may be started by the use of the verification tool 140 to notify the DU 101 of a downlink reference signal of a level corresponding to a test item. In this instance, information of the reception quality intended by the tester is input to the DU 101 from the verification tool 140. As a result, it becomes possible to implement an efficient test without using actual reception quality of the UE 104 in wireless intervals.

Further, the downlink reference signal measurement by the DU 101 at step S401 depicted in FIG. 4 may be started by the use of the front haul analyzing unit 150 to notify the DU 101 of a downlink reference signal of a level corresponding to a test item. In this instance, the front haul analyzing unit 150 inputs to the DU 101, information in which the notified reception quality is written over with the reception quality intended by the tester. As a result, it becomes possible to implement an efficient test without using the actual reception quality of the UE in wireless intervals.

Figure 5:
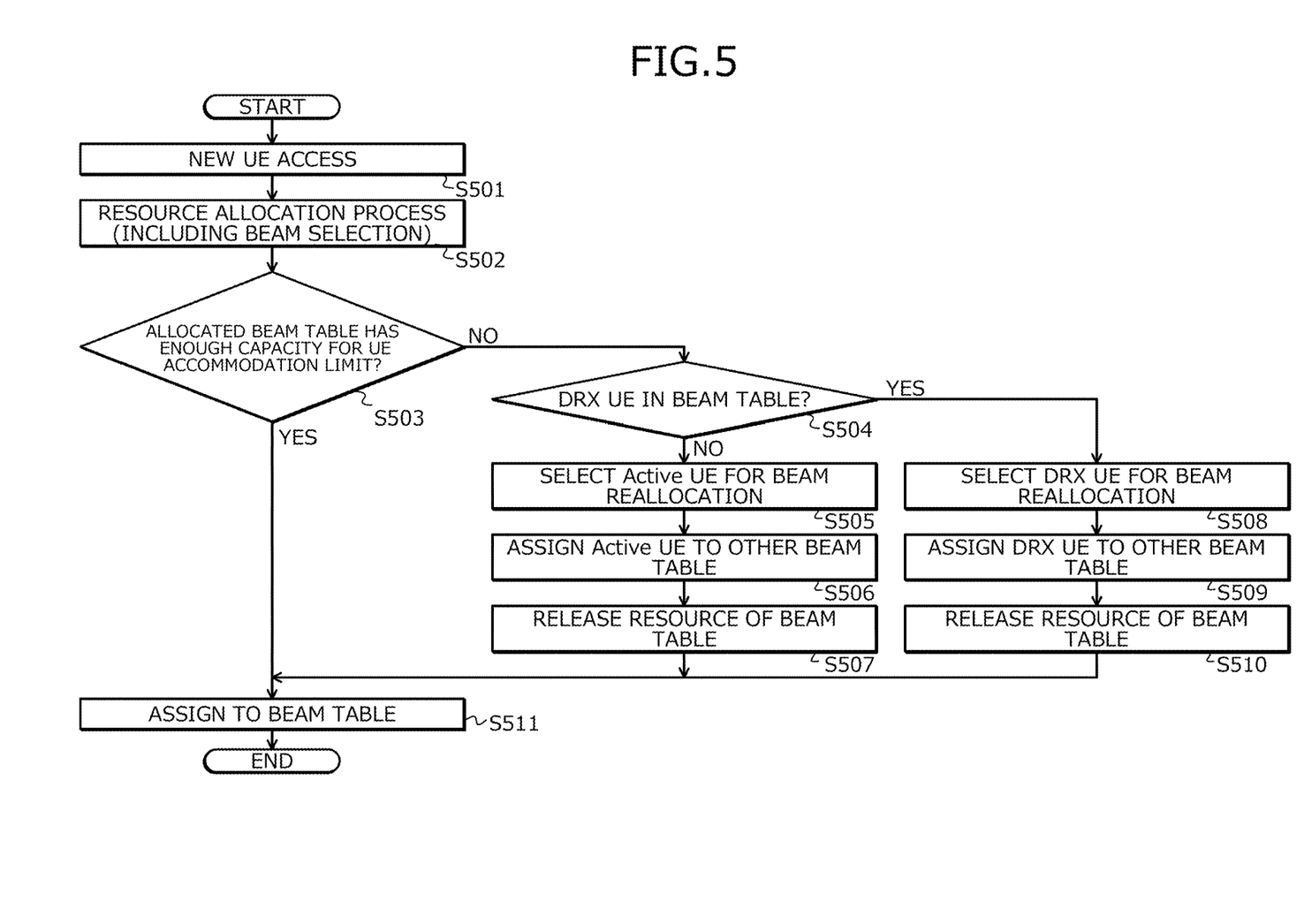
FIG. 5 is a flowchart depicting an example of an immediate resource allocation process for a UE newly requesting connection.

The process (2) for immediate resource allocation for a UE 104 newly requesting connection is described. FIG. 5 is a flowchart depicting an example of the immediate resource allocation process for a UE newly requesting connection. The controller (the processor 301) of the DU 101 implements the process depicted in FIG. 5 each time a new access of a UE 104 occurs in the process in FIG. 4 during operation of the wireless communications system 100. When a beam is selected for reallocation, a new connection request from a UE 104 during the periodic interval is handled by the process depicted in FIG. 5.

First, the DU 101, when there is access by a new UE 104 (step S501), implements a resource allocation process for the new UE 104 (step S502). The resource allocation process includes a beam selection process.

Subsequently, the DU 101 determines whether the UE accommodation limit of the beam table 120 to which the new UE 104 is to be assigned has some leeway, that is, the UE accommodation limit has not been reached (step S503). When the determination result at step S503 indicates that the UE accommodation limit of the beam table 120 selected for the new UE 104 has some leeway (step S503: YES), the DU 101 transitions to the process at step S511. On the other hand, when the UE accommodation limit of the beam table 120 selected for the new UE 104 has no leeway, that is, the UE accommodation limit has been reached (step S503: NO), the DU 101 transitions to the process at step S504.

At step S504, the DU 101 determines whether a UE 104 in the DRX state is present in the beam table 120 to which the new UE 104 is to be assigned (step S504). When the determination result at step S504 indicates that a UE 104 in the DRX state is present in the beam table 120 (step S504: YES), the DU 101 transitions to the process at step S508. On the other hand, when no UE 104 in the DRX state is present in the beam table 120 (step S504: NO), the DU 101 transitions to the process at step S505.

At step S505, the DU 101 selects a UE 104 that is in the "Active state", to be subject to beam reallocation (step S505). Next, the DU 101 assigns the Active UE 104 to another beam table 120 (step S506). Next, the DU 101 releases the corresponding resource in the beam table 120 to which the new UE 104 is to be assigned (step S507) and transitions to the process at step S511.

At step S508, the DU 101 selects a UE 104 that is in the DRX state to be subject to beam reallocation (step S508). Next, the DU 101 assigns the UE 104 that is in the DRX state to another beam table 120 (step S509). Next, the DU 101 releases the corresponding resource in the beam table 120 to which the new UE 104 is to be assigned (step S510) and transitions to the process at step S511.

At step S511, the DU 101 assigns the new UE 104 to the beam table 120 to which the new UE 104 is to be assigned (step S511) and terminates the process described.

In the process depicted in FIG. 5, when the DU 101 selects a UE 104 for beam reallocation at step S505 and step S508, the DU 101 uses the threshold (the second threshold) of a level higher than that of the threshold (the first threshold) used in the periodic resource reallocation process depicted in FIG. 4. Further, in the processes at step S505 and step S508, the DU 101 increases the level of the threshold used for checking the reception quality, the level of the threshold being increased stepwise from the lowest level to a high level. Subsequently, the DU 101, when detecting a UE 104 to be subject to beam reallocation, executes reallocation control with respect to the detected UE 104.

Further, in the process depicted in FIG. 5, when a UE for beam reallocation is selected and the reallocation candidate beam table 120 does not have enough capacity and there is no UE 104 in the DRX state, in the processes at step S505 and thereafter, a UE 104 in the "Active state" is selected.

In this manner, the DU 101, when selecting a UE for beam reallocation, checks for a UE in the DRX state, the available capacity of the reallocation candidate beam table 120, or the usage history of the reallocation candidate beam table 120. Further, the DU 101 may preferentially set a UE that is in the DRX state, a UE to be moved to a beam table 120 with a greater available capacity among the reallocation candidates or a beam table 120 that has no assigned UEs, among the reallocation candidates. As a result, even in an instance when the beam table 120 that is to accommodate a UE 104 newly requesting connection does not have enough capacity, it becomes possible for the DU 101 to perform immediate resource allocation for the new UE 104.

Further, the process depicted in FIG. 5 may be started using the verification tool 140. In this instance, to verify that a beam table 120 to which the new UE 104 is to be assigned does not have enough available capacity, the verification tool 140 performs control to deliberately set the beam table 120 to the "Full state". As a result, it becomes possible to implement an efficient test without using the actual reception quality of the UE 104 in wireless intervals.

Figure 6:
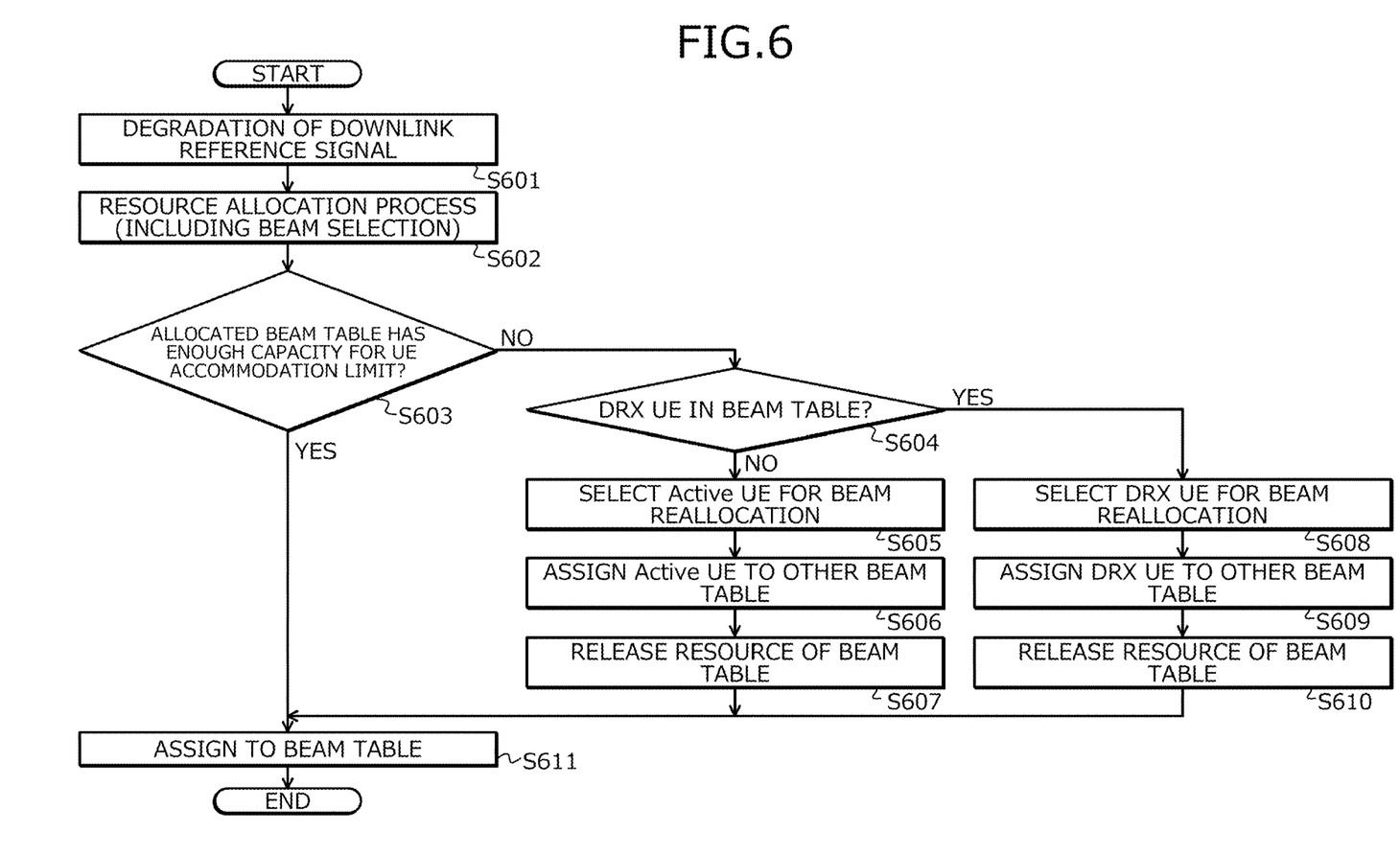
FIG. 6 is a flowchart of an example of an immediate resource reallocation process for a UE that requires beam switching.

The process (3) for immediate resource reallocation for a UE 104 requesting beam switching is described. FIG. 6 is a flowchart of an example of the immediate resource reallocation process for a UE that requires beam switching. The controller (the processor 301) of the DU 101 implements the process depicted in FIG. 6 each time there is a UE 104 that requires beam switching due to degradation of reception quality, in the process in FIG. 4 during operation of the wireless communications system 100. When a beam is selected for reallocation, beam switching for a UE 104 during the periodic interval is handled by the process depicted in FIG. 6.

First, the DU 101, when detecting a UE 104 for which downlink reference signal degradation has occurred (step S601), implements the resource allocation process for the UE 104 suffering signal degradation (step S602). The resource allocation process includes the beam selection process.

Subsequently, the DU 101 determines whether the UE accommodation limit of the beam table 120 to which the UE 104 suffering signal degradation is to be assigned has some leeway (step S603). When the determination result at step S603 indicates that the UE accommodation limit of the beam table 120 to which the UE 104 suffering signal degradation is to be assigned has some leeway (step S603: YES), the DU 101 transitions to the process at step S611. On the other hand, when the UE accommodation limit of the beam table 120 to which the UE 104 suffering signal degradation is to be assigned has no leeway (step S603: NO), the DU 101 transitions to the process at step S604.

At step S604, the DU 101 determines whether a UE 104 in the DRX state is present in the beam table 120 to which the UE 104 suffering signal degradation is to be assigned (step S604). When the determination result as step S604 indicates that a UE 104 in the DRX state is present in the beam table 120 (step S604: YES), the DU 101 transitions to the process at step S608. On the other hand, when no UE 104 in the DRX state is in the beam table 12 (step S604: NO), the DU 101 transitions to the process at step S605.

At step S605, the DU 101 selects a UE 104 that is in the "Active state" (step S605). Next, the DU 101 assigns the Active UE 104 to another beam table 120 (step S606). Next, the DU 101 releases the corresponding resource in the beam table 120 to which the UE 104 suffering signal degradation is to be assigned (step S607) and transitions to the process at step S611.

At step S608, the DU 101 selects a UE 104 that is in the DRX state subject to beam reallocation (step S608). Next, the DU 101 assigns the UE 104 that is in the DRX state to another beam table 120 (step S609). Next, the DU 101 releases the corresponding resource in the beam table 120 to which the UE 104 suffering signal degradation is to be assigned (step S610) and transitions to the process at step S611.

At step S611, the DU 101 assigns to the beam table 120, the UE 104 that requires beam switching (step S611) and terminates the process described.

In the process depicted in FIG. 6, when the DU 101 selects a UE 104 for beam reallocation at step S605 and step S608, the DU 101 uses the threshold (the second threshold) of a level higher than that of the threshold (the first threshold) used in the periodic resource reallocation process depicted in FIG. 4. Further, in the processes at step S605 and step S608, the DU 101 increases the level of the threshold used for checking the reception quality, the level of the threshold being increased stepwise from the lowest level to a high level. Subsequently, the DU 101, when detecting a UE 104 to be subject to beam reallocation, executes reallocation control with respect to the detected UE 104.

Further, in the process depicted in FIG. 6, when a UE for beam reallocation is selected and the reallocation candidate beam table 120 does not have enough available capacity and there is no UE 104 in the DRX state, in the processes at step S605 and thereafter, a UE 104 in the "Active state" is selected.

In this manner, the DU 101, when selecting a UE for beam reallocation, checks for a UE in the DRX state, the available capacity of the reallocation candidate beam table 120, or the usage history of the reallocation candidate beam table 120. Further, the DU 101 may preferentially set a UE that is in the DRX state, a UE to be moved to a beam table 120 with a greater available capacity among the reallocation candidates or a beam table 120 that has no assigned UEs, among the reallocation candidates. As a result, even in an instance in which the beam table 120 to accommodate a UE 104 suffering signal degradation and requesting beam switching does not have enough available capacity, it becomes possible for the DU 101 to perform immediate resource allocation for a UE 104 that requires beam switching.

Further, the process depicted in FIG. 6 may be started using the verification tool 140. In this instance, to verify that a beam table 120 to which the new UE 104 is to be assigned does not have enough available capacity, the verification tool 140 performs control to deliberately set the beam table 120 to the "Full state". As a result, it becomes possible to implement an efficient test without using the actual reception quality of the UE 104 in wireless intervals.

The wireless communications device of the embodiment described above performs wireless resource management at the base station that performs wireless communication with terminals by a predetermined beam. The wireless communications device includes beam tables in which terminals, each, accommodated by beams are set, the wireless communications device further having a resource managing unit that manages the beam tables. The resource managing unit, during operation of the system, determines a terminal that can be moved between beam tables and another beam table capable of accommodating this movable terminal. The resource managing unit moves the moveable terminal to another beam table. As a result, the number of terminals accommodated by each of the beam tables may be adjusted to become uniform. Further, at the base station (RU) managed by the wireless communications device (DU), UEs 104 that unnecessarily occupy the finite beams are moved to other beams, whereby it becomes possible to realize network operation facilitating connection and improved user satisfaction.

Further, the wireless communications device, via the resource managing unit, for each prescribed period, detects the reception quality of downlink signals reported by terminals. When a terminal is present whose downlink reception quality has become not more than the first threshold at which stable reception is performed, the resource managing unit performs reallocation by moving the terminal to another beam table that meets a reception quality that enables communication to continue. As a result, it becomes possible to use the reception quality to optimize the beam tables in a state that enables continuous communication of terminals subject to beam reallocation.

Further, in the wireless communications device, the resource managing unit has the second threshold that corresponds to a reception quality at least equal to that of the first threshold. In an instance when during operation, a terminal requests connection by a predetermined beam and the beam table corresponding to the predetermined beam of the terminal has no leeway, the resource managing unit determines the presence of a terminal whose downlink reception quality is at least equal to the first threshold but not more than the second threshold. The resource managing unit reassigns the terminal to another beam table that enables communication to continue and assigns to the beam table of the predetermined beam, the terminal that requested connection. As a result, during operation, it becomes possible to move a terminal of the second threshold, which is higher than the first threshold, to another beam table without degradation of the reception quality thereof and at the same time, assign to the beam table of the predetermined beam, the terminal that requested connection.

Further, in the wireless communications device, the resource managing unit has the second threshold that corresponds to a reception quality that is at least equal to that of the first threshold. In an instance when, during operation, the downlink reception quality of the beam currently used by a terminal degrades and the beam table of another beam enabling communication of the terminal to continue has no leeway, the resource managing unit determines the presence of a terminal whose downlink reception quality is at least equal to the first threshold but not more than the second threshold. The resource managing unit assigns the terminal to another beam table that enables the communication to continue and assigns to the said beam table that enables the communication to continue, the terminal whose reception quality degraded. As a result, during operation, it becomes possible to move a terminal of the second threshold, which is higher than the first threshold, to another beam table to continue communication without degradation of reception quality.

Further, in an instance in which a beam table to which a terminal that requested connection or a terminal whose downlink reception quality degraded is assigned has no leeway, in the wireless communications device, the resource managing unit checks the communication state of the terminals present in the concerned beam table and preferentially reassigns a terminal that is in the DRX state to another beam table. The DRX state has a sleep state due to intermittent reception, which suppresses data communication more than in the "Active state" and thus, a UE in the DRX state is preferentially selected, whereby it becomes possible to perform reallocation efficiently.

Further, in an instance in which the resource managing unit determines multiple terminals to be subject to beam reallocation, the wireless communications device preferentially reassigns a terminal that can be moved to another beam table that has a greater available capacity among other beam tables that can been reallocated. In this manner, even in an instance in which multiple terminals are selected for beam reallocation, the terminals to be subject to beam reallocation are determined giving priority to reassignment of a terminal to a beam table with relatively more available capacity, whereby congestion of the beam table to which a terminal is to be reassigned may be prevented.

Further, in an instance in which the resource managing unit determines multiple terminals to be subject to beam reallocation, the wireless communications device, based on the usage history of the beams of the terminals that are to be subject to beam reallocation, preferentially reassigns a terminal, which can be moved to a beam table that has no history of reassignment of the terminal. In this manner, in an instance in which multiple terminals are selected for beam reallocation, the usage history of the beam tables of the beams of the selected terminals is referred to and a terminal that has no history of assignment is preferentially determined, whereby congestion of the beam table to which a terminal is to be reassigned may be prevented.

Further, in an instance in which the resource managing unit determines multiple terminals that are to be subject to beam reallocation, the wireless communications device checks the reception quality of the terminals that are to be subject to beam reallocation and preferentially reassigns the terminal that has the lowest reception quality. As a result, it becomes possible to prevent congestion of the beam table to which a terminal is to be reassigned and to perform the reallocation process efficiently.

Further, the verification tool may be connected to the wireless communications device and information corresponding to a predetermined reception quality of a terminal may be directly input from the verification tool. As a result, it becomes possible to operate the verification tool and simply implement the process of optimizing the beam tables without receiving a report of the reception quality of the downlink signal from the terminal.

Further, in the wireless communications device, an analyzing unit may be connected to the communications interface with the base station and information corresponding to a predetermined reception quality of a terminal may be input via the communications interface, from the analyzing unit. As a result, it becomes possible to operate the analyzing unit and simply implement the process of optimizing the beam tables without receiving a report of the reception quality of the downlink signal from the terminal.

Further, the verification tool may be connected to the wireless communications device and information of the terminals accommodated by the beam tables may be changed, added, or deleted by the verification tool. As a result, the verification tool may be used to control the priority of terminals to be subject to beam reallocation and change, add, or delete, etc. the information of the terminals set in the beam tables, whereby the number of terminals accommodated in the beam tables may be controlled.

The radio beam allocation method described in the embodiments of the present disclosure may be implemented by executing a prepared program on the processor of the wireless communications device. The method is recorded to a non-transitory, computer-readable recording medium such as a hard disk, a flexible disk, Compact Disc-Read Only Memory (CD-ROM), a Digital Versatile Disk (DVD), and a flash memory, and is read out from the recording medium and executed by a computer. Further, the method may be distributed via a network such as the Internet.

According to one aspect of the present disclosure, an effect is achieved in that beam tables may be optimized.

All examples and conditional language provided herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

What is claimed is:

1. A wireless communications device configured to perform wireless resource management at a base station that performs wireless communication with a plurality of terminals by a predetermined beam, the wireless communications device comprising:
   a memory storing therein a plurality of beam tables set with the terminals accommodated by a plurality of beams; and
   processor circuitry connected to the memory and configured to manage the beam tables, wherein
   the processor circuitry:
      during system operation, determines a movable terminal that, of the terminals, is movable between the beam tables, and another beam table that, of the beam tables, is configured to accommodate the movable terminal, and
      moves the moveable terminal to the other beam table and adjusts a number of the terminals accommodated by each of the beam tables.

2. The wireless communications device according to claim 1, wherein
   the processor circuitry:
      for each prescribed period, detects downlink reception quality of a downlink signal reported from each of the terminals, and
      among the terminals, when a first terminal is present for which the downlink reception quality is not more than a first threshold at which stable reception is performed, the processor circuitry performs reallocation by moving the first terminal to another beam table that, of the beam tables, meets a reception quality that enables communication to continue.

3. The wireless communications device according to claim 2, wherein
   the processor circuitry:
      has a second threshold that corresponds to a reception quality at least equal to that of the first threshold,
      during the system operation, among the terminals, when a second terminal requests a connection by a predetermined beam and, of the beam tables, a corresponding beam table of the predetermined beam of the second terminal has no leeway, the processor circuitry determines, in the corresponding beam table, a presence of a third terminal having a downlink reception quality that is at least equal to the first threshold but not more than the second threshold and assigns the third terminal to another beam table that, of the beam tables, enables communication to continue, and the processor circuitry assigns the second terminal to the corresponding beam table of the predetermined beam.

4. The wireless communications device according to claim 2, wherein the processor circuitry:
has a second threshold that corresponds to a reception quality that is at least equal to that of the first threshold,
during the system operation, among the terminals, when a fourth terminal having degraded downlink reception quality of a currently used beam is present and, of the beam tables, a corresponding beam table of another beam enabling communication of the fourth terminal to continue has no leeway, the processor circuitry determines, in the corresponding beam table, presence of a fifth terminal having a downlink reception quality that is at least equal to the first threshold but not more than the second threshold and assigns the fifth terminal to another beam table that, of the beam tables, enables communication of the fifth terminal to continue, and
the processor circuitry assigns the fourth terminal to the corresponding beam table that enables communication of the fourth terminal to continue.

5. The wireless communications device according to claim 3, wherein the processor circuitry, when, among the beam tables, a beam table to which the second terminal requesting connection or a fourth terminal having degraded downlink reception quality is assigned has no leeway, checks a communication state of terminals present in the beam table and preferentially reassigns a terminal in a discontinuous reception (DRX) state to another beam table.

6. The wireless communications device according to claim 3, wherein the processor circuitry, when two or more of the terminals are to be reassigned, preferentially reassigns a terminal movable to the other beam table having a greater available capacity among other beam tables to which assignment of the terminal is possible.

7. The wireless communications device according to claim 3, wherein the processor circuitry, when two or more of the terminals are to be reassigned, preferentially reassigns, based on usage histories of the beams of the terminals to be reassigned, a terminal movable to a beam table having no history of reassignment of the terminal.

8. The wireless communications device according to claim 3, wherein the processor circuitry, when two or more of the terminals are to be reassigned, checks reception quality of the two or more terminals to be reassigned and preferentially reassigns a terminal having a lowest reception quality of the two or more terminals to be reassigned.

9. The wireless communications device according to claim 4, wherein the processor circuitry, when, among the beam tables, a beam table to which a second terminal requesting connection or the fourth terminal having degraded downlink reception quality is assigned has no leeway, checks a communication state of terminals present in the beam table and preferentially reassigns a terminal in a discontinuous reception (DRX) state to another beam table.

10. The wireless communications device according to claim 4, wherein the processor circuitry, when two or more of the terminals are to be reassigned, preferentially reassigns a terminal movable to the other beam table having a greater available capacity among other beam tables to which assignment of the terminal is possible.

11. The wireless communications device according to claim 4, wherein the processor circuitry, when two or more of the terminals are to be reassigned, preferentially reassigns, based on usage histories of the beams of the terminals to be reassigned, a terminal movable to a beam table having no history of reassignment of the terminal.

12. The wireless communications device according to claim 4, wherein the processor circuitry, when two or more of the terminals are to be reassigned, checks reception quality of the two or more terminals to be reassigned and preferentially reassigns a terminal having a lowest reception quality of the two or more terminals to be reassigned.

13. The wireless communications device according to claim 2, wherein a verification tool is connected to the wireless communications device, and
information corresponding to a predetermined reception quality of the terminal is directly input from the verification tool.

14. The wireless communications device according to claim 2, wherein an analyzing device is connected to a communications interface with the base station, and
information indicating a predetermined reception quality of the terminals is input from the analyzing device, via the communications interface.

15. The wireless communications device according to claim 1, wherein a verification tool is connected to the wireless communications device, and
information of a terminal among the terminals accommodated by the beam tables is changed, added, or deleted by the verification tool.

16. A wireless communications system, comprising:
a central unit (CU);
a distributed unit (DU);
a remote unit (RU); and
a plurality of user equipment (UE), wherein
the DU includes a memory storing therein a plurality of beam tables set with the UEs accommodated by a plurality of beams, and a-processor circuitry configured to manage the beam tables,
the processor circuitry:
during operation of the system, determines a movable UE that, of the UEs, is movable between the beam tables, and another beam table that, of the beam tables, is configured to accommodate the movable UE, and
moves the movable UE to the other beam table and adjusts a number of the UEs accommodated by each of the beam tables.

17. The wireless communications system according to claim 16, further comprising
- a verification tool connected to the DU, the verification tool directly inputting to the DU, information corresponding to a predetermined reception quality of the UEs, wherein
- the processor circuitry moves the movable UE to the other beam table, based on the reception quality.

18. The wireless communications system according to claim 16, further comprising
- an analyzing device connected to a front haul interface between the RU and the DU, the analyzing device inputting to the DU via the front haul interface, information corresponding to a predetermined reception quality of the UEs, wherein
- the processor circuitry moves the movable UE to the other beam table, based on the reception quality.

19. A radio beam allocation method executed by a wireless communications device configured to perform radio beam management at a base station that performs wireless communication with a plurality of terminals by a predetermined beam, the method comprising:
- during system operation, determining a movable terminal that, of the terminals, is movable between a plurality of beam tables, and another beam table that, of the beam tables, is configured to accommodate the movable terminal; and
- moving the moveable terminal to the other beam table and adjusting a number of the terminals accommodated by each of the beam tables.

20. A computer-readable recording medium storing therein a program for causing a processor circuitry of a wireless communications device configured to perform radio beam management at a base station that performs wireless communication with a plurality of terminals by a predetermined beam, to execute a process comprising:
- during system operation, determining a movable terminal that, of the terminals, is movable between a plurality of beam tables, and another beam table that, of the beam tables, is configured to accommodate the movable terminal; and
- moving the moveable terminal to the other beam table and adjusting a number of the terminals accommodated by each of the beam tables.

\* \* \* \* \*